(12) United States Patent
Engel

(10) Patent No.: US 7,019,782 B2
(45) Date of Patent: Mar. 28, 2006

(54) METHOD AND DEVICE FOR ADJUSTING A CAMERA

(75) Inventor: Michael Engel, Karlsruhe (DE)

(73) Assignee: Vision Components Geselslchaft für Bildverarbeitungssysteme mbH, Ettlingen (DE)

( * ) Notice: Subject to any disclaimer, the term of this patent is extended or adjusted under 35 U.S.C. 154(b) by 773 days.

(21) Appl. No.: 10/203,163

(22) PCT Filed: Feb. 21, 2001

(86) PCT No.: PCT/DE01/00701

§ 371 (c)(1),
(2), (4) Date: Aug. 6, 2002

(87) PCT Pub. No.: WO01/65837

PCT Pub. Date: Sep. 7, 2001

(65) Prior Publication Data

US 2003/0021603 A1    Jan. 30, 2003

(30) Foreign Application Priority Data

Feb. 29, 2000   (DE) ................................ 100 09 571

(51) Int. Cl.
*G03B 13/00*    (2006.01)
*H04N 5/222*    (2006.01)

(52) U.S. Cl. ....................................... 348/345; 348/370

(58) Field of Classification Search ........ 348/135–136, 348/78–79, 345, 348, 370, 335, 340–341; 359/382, 362, 396, 250, 385; 396/157–158, 396/163, 155, 199; 351/211–212; 362/11, 362/5

See application file for complete search history.

(56) References Cited

U.S. PATENT DOCUMENTS

| | | | |
|---|---|---|---|
| 3,836,919 A | | 9/1974 | Matsumoto et al. |
| 4,899,188 A | | 2/1990 | Lecover |
| 5,212,514 A | | 5/1993 | Goto |
| 5,335,037 A | | 8/1994 | Yoshida |
| 5,457,492 A | * | 10/1995 | Sasaki et al. ............... 348/126 |
| 5,815,748 A | | 9/1998 | Hamamura et al. |
| 5,940,635 A | | 8/1999 | Sensui |
| 6,791,608 B1 | * | 9/2004 | Miyazawa .................. 348/246 |

FOREIGN PATENT DOCUMENTS

| | | |
|---|---|---|
| EP | 0 080 340 B1 | 8/1986 |
| GB | 2 257 800 A | 1/1993 |

* cited by examiner

*Primary Examiner*—Ngoc-Yen Vu
*Assistant Examiner*—Nicholas G. Giles
(74) *Attorney, Agent, or Firm*—Venable LLP; Catherine M. Voorhees

(57) ABSTRACT

For focussing and/or adjusting of the image field of a camera (1) with an image sensor (2) and an objective (3), it is proposed to provide light sources (7) between objective (3) and image sensor (2), which are projected into the object plane (5) by means of a partially transmitting mirror (8) arranged between the light sources (7) and the image sensor (2).

26 Claims, 4 Drawing Sheets

METHOD AND DEVICE FOR ADJUSTING A CAMERA

BACKGROUND OF THE INVENTION

Figure 1:
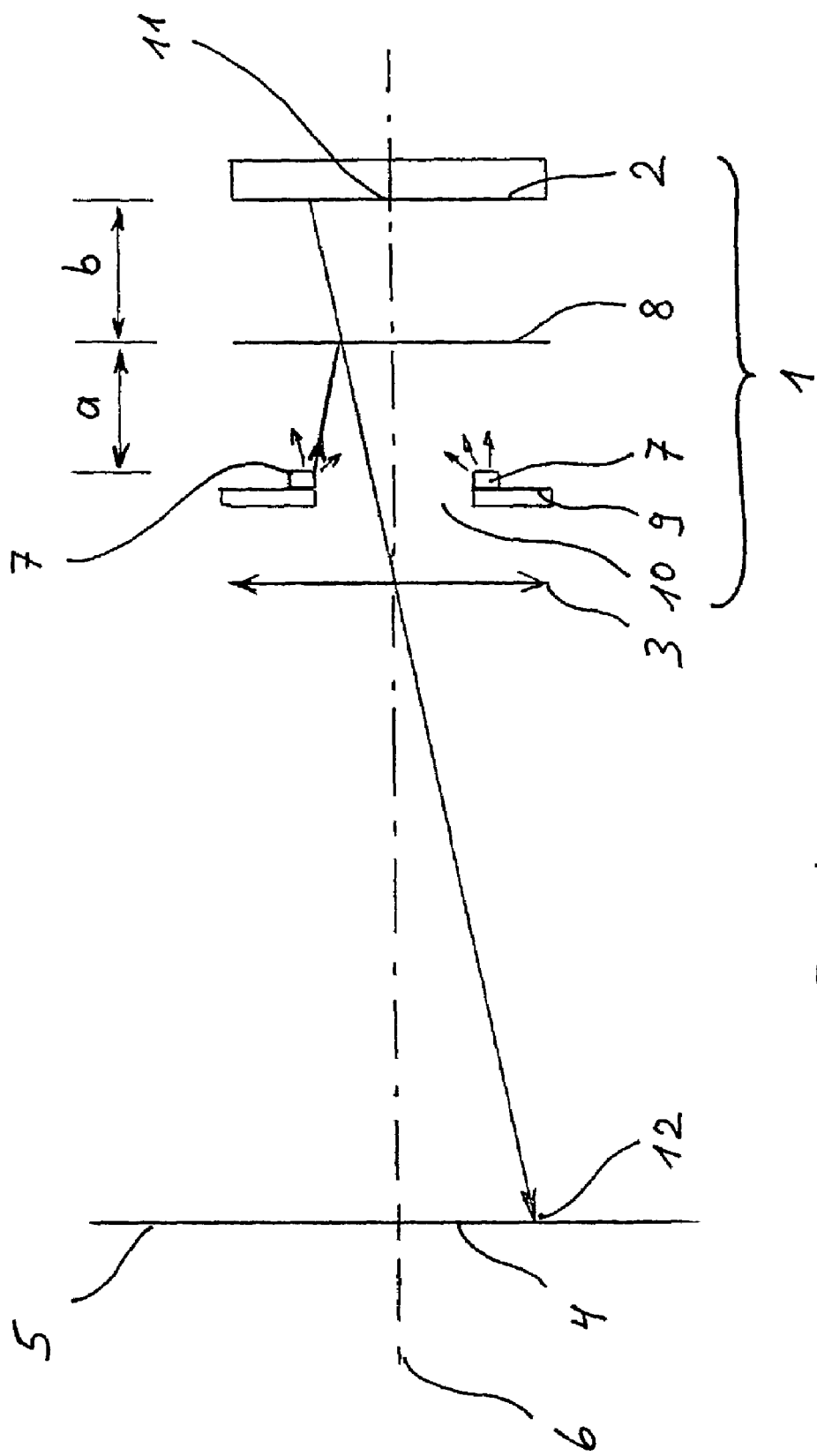

This invention is related to a method and to a device for adjusting a camera with an image sensor for taking a picture and with an objective for imaging an object on the image sensor.

During the use of cameras, for example in the scope of an industrial production for the monitoring, the control and the regulation of production procedures, it is necessary to adjust the camera. For this, the adjustment comprises the image sharpness setting of the optical imaging by appropriate corrective measures, as e.g. the change of the image width or object width of the optical imaging, or the adjustment of the objective, as well as the alignment of the position of the image field, which must correspond to the required visual field on the object, and which is adjusted by the position or by the alignment of the image sensor. These adjustment measures must be performed on the camera directly and on site.

In case of camera systems with image sensors, a video signal or a video-similar signal is often available for this purpose, allowing to display the image taken by the image sensor on a locally connected video monitor, so that the sharpness and the position of the picture taken can be controlled using the display of this monitor. This method, however, has the disadvantage that the camera must be equipped with a sophisticated electronic system for generating the video signal required on site, and that the camera can only be adjusted if a connected monitor is available for this purpose.

Another known possibility to check and to adjust the sharpness and/or the image field, even if no video signal or monitor is available, is to equip the camera with an autofocussing device which adjusts the correct sharpness automatically, making a manual adjustment of the sharpness superfluous, as well as including an additional viewfinder in the camera allowing to view the image field. This solution has the disadvantage that an autofocussing device is technically sophisticated, as the distance adjustment, in many application cases, does not have to be performed often, e.g. only during the initial set-up, or in case of maintenance and repair measures. The viewfinder used for this has the disadvantage that the image field cannot be recognized sufficiently in many cases, in particular if the object width varies, and that the corresponding space conditions do not always allow to view the viewfinder with the human eye.

For this reason, projection devices as to the state-of the-art are known which project an adjustment mark onto the object plane with a projection device; the sharpness of the image and/or the image field can be controlled and adjusted with this adjustment mark. The adjustment marks are made visible by an appropriate screen, e.g. a simple piece of white paper.

A known projection system of this type uses two projection devices independent from the imaging system for the image sensor, each of them projecting a circle onto the object plane. Both circles are identical in diameter and the projection is performed with an angle slightly deviating from parallelism. The projection devices are adjusted in a way that the two projected circles unite to form a single circle, in case of a correct distance between the image sensor and the object to be taken, i.e. in case of optimum image sharpness. A third projection device is arranged, projecting a third circle, roughly indicating the size and the position of the visual field, i.e. the range of the object displayed on the image field of the image sensor.

Such known systems with projection devices are technically sophisticated, as at least one further imaging optical system for the adjustment projection devices is necessary besides the underlying imaging optical system of the camera. Furthermore, in case of a possible readjustment or change of the optical system, it is necessary to perform a complete new adjustment of the projection device.

An optical system for which an automatic focussing process is performed is known from the document EP 0080340 B1. Here, the optical system projects light onto the object, the object reflects the light and the optical system captures the light again; for focusing purposes, the light is displayed on an image sensor which is arranged in the image plane of the objective. Adjustment and setting on site using the human eye is not possible here without using technical equipment for generating an image, captured by the image sensor for adjustment purposes. From document DE-OS 2413155 a comparable device is known which uses two image sensors.

A projection device for adjusting the image field is known from document U.S. Pat. No. 4,899,188, however, it does not solve the problem of the focusing of a reproduction device.

An image field recognition device is known from the document GB 2257800 A. For this, laser systems are used the light of which does not pass the camera objective. Thus, a sharpness control in not possible.

SUMMARY OF THE INVENTION

Taking into account this state of the art, this invention has the object to provide a method and a device for the adjustment of a camera which is technically less sophisticated and which offers advantages in practical use.

According to the invention, this problem is solved by a device with the features of the appended claim 1 and by a method with the features of the appended claims 17 and 18, respectively. Preferred embodiments and further developments of this invention can be taken from the dependent claims, and the subsequent description with the corresponding drawings.

Thus, a camera according to the invention with an image sensor for taking a picture and with an objective for imaging an object on the image sensor, includes a device for adjusting the distance between the camera and the object, or for adjusting the objective; this device comprises a partially transmitting mirror arranged between the objective and the image sensor, and at least one light source. Furthermore, it shows following special features: the partially transmitting mirror is arranged in parallel to the light-sensitive surface of the image sensor, and the at least one light source is arranged between the objective and the partially transmitting mirror, emitting light in the direction towards the partially transmitting mirror. For this, the distance between the light source and the mirror is as long as the distance between the mirror to the image sensor.

In a method according to the invention, for adjusting the distance between a camera and an object, or for adjusting the objective of a camera, wherein the camera comprises an image sensor for taking a picture and an objective for imaging an object onto the image sensor, the camera is equipped with a partially transmitting mirror arranged between the objective and the image sensor, and at least one light source is provided. The partially transmitting mirror is arranged in parallel to the light-sensitive surface of the image sensor, the at least one light source is arranged between the objective and the partially transmitting mirror, emitting light towards the partially transmitting mirror. For this, the distance between the light source and the mirror is as long as the distance between the mirror and the image sensor, and the adjustment of the distance between camera and object, or the adjustment of the objective, is performed according to the sharpness of the image of the at least one light source in the object plane.

In a method according to the invention, for adjusting the position of a camera in relation to an object, wherein the camera comprises an image sensor for taking a picture and an objective for imaging an object onto the image sensor, the camera is equipped with a partially transmitting mirror arranged between the objective and the image sensor, and at least one light source is provided. The partially transmitting mirror is arranged in parallel to the light-sensitive surface of the image sensor, and the at least one light source is arranged between the objective and the partially transmitting mirror, emitting light towards the partially transmitting mirror. For this, the distance between the light source and the mirror is as long as the distance between the mirror and the image sensor, and the at least one light source is arranged in relation to the image sensor in a way that its image is projected by the partially transmitting mirror and the objective to a place on the object, located in the border range of the visual field of the image sensor. The position of the camera in relation to the object is then adjusted according to the position of the image of the at least one light source projected onto the object.

According to the invention, at least one light source is provided, serving as adjustment aid, wherein the image of the light source is projected onto the object, serving as sharpness and/or image field mark. The sharpness and the image field, respectively, can be adjusted by viewing the image of the adjustment aid on the object. A very compact structure is achieved by using a partially transmitting mirror, oriented normally to the optic axis; the adjustment expense is very low.

Many advantages stem from the fact that the imaging objective or the optical path, respectively, for the imaging of the object onto the image sensor are used for the original generation of the object image on the image sensor, as well as for the projection of the at least one light source via the partially transmitting mirror into the object plane. The device according to the invention is easy to build, technically inexpensive, requires only a small amount of adjustment and allows the use of interchangeable objectives, which was hitherto impossible with respect to the state-of-the-art. The adjustment can be performed easily on site by viewing the light source projected onto the object with respect to the sharpness of imaging or the adjustment of the image field without the necessity of additional, technically expensive equipment.

This invention achieves goals the branch has been looking for for a long time already. In order-to achieve good results with respect to the practical use as well as with respect to the constructive requirements, following measures are preferably used, individually or in a combination.

According to an advantageous additional feature, it can be provided that the image sensor and the light source are arranged on different sides of the partially transmitting mirror. Another preferred feature can be that the objective, the light source, the partially transmitting mirror and the image sensor are arranged in a straight row.

An advantageous feature of the invention can be the fact that the adjustment can be performed by viewing the image of the at least one light source projected through the objective, by eye, in the object plane. Thus, no additional technical equipment is necessary for taking a picture; the image of the light source projected through the objective can be viewed directly by a user in the object plane and can serve for adjustment purposes.

According to an additional preferred feature, it is proposed that the at least one light source has a small light emitting surface. The smaller the light emitting surface, the more exactly the sharpness or the position of its image point can be recognized on the object. A possibly small extension of the light source, being almost point-shaped in an ideal case, has the advantage that it becomes easier, in the individual case of application, to arrange it in a way that the optical path is kept free. Furthermore, it is advantageous if the light emitted from the light source is as bright as possible, i.e. the light source has a high light density, as this improves the recognizability of the projected image of the light source.

In some cases of application, it can also be advantageous if the light source is shaped in a way that it emits light in a line. By means of a straight-line or bow-shaped light source, an advantageous focusing and/or display of the visual field border can be achieved in many cases of application.

In the framework of the invention, light-emitting diodes, in particular those with a small light surface, are advantageous; these are commercially available in multiple forms. Light sources which do not comprise optical elements, e.g. a lens, have proven particularly advantageous, as any optical element of the light source would change the optical path, making it necessary to consider this influence in the constructive design. In this respect, raw LED chips without housing, or LED's with a housing with a flat light output orifice, are particularly advantageous.

One light source is principally sufficient for focusing the optical image. This is also true for the adjustment of the image field position, if an appropriate reference point is available on the object. In other cases, however, it can be advantageous to use two or more light sources in order to perform the adjustment of additional degrees of freedom. If, for example, it is necessary to align the image sensor in parallel to the object plane, it can be advantageous to use at least three light sources, preferably not arranged in a collinear way, as the position of a plane is defined by three points. In this case, the light sources are preferably arranged in a plane parallel to the light-sensitive surface of the image sensor.

A preferred feature, in particular for adjusting the image field, can be that the at least one light source is arranged in relation to the image sensor, in a way that its image is projected by the partially transmitting mirror and the objective, onto a position of the object which is in the area of the border of the visual field of the image sensor. Thereby, it is possible to visualize directly the border of the object range imaged onto the image sensor, and thus the visual field or image field, respectively, when the image of the light source is projected onto the object. According to the embodiment of the camera and the prevailing practical circumstances, the visual field is given by an aperture located at the outside of the camera, the aperture of the camera, or by the extension of the image sensor itself.

BRIEF DESCRIPTION THE DRAWINGS

Figure 2:
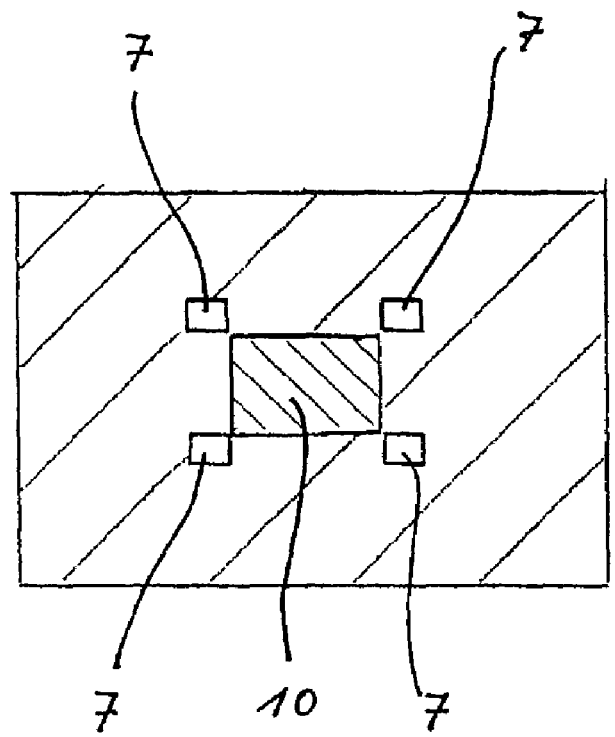
Figure 3:
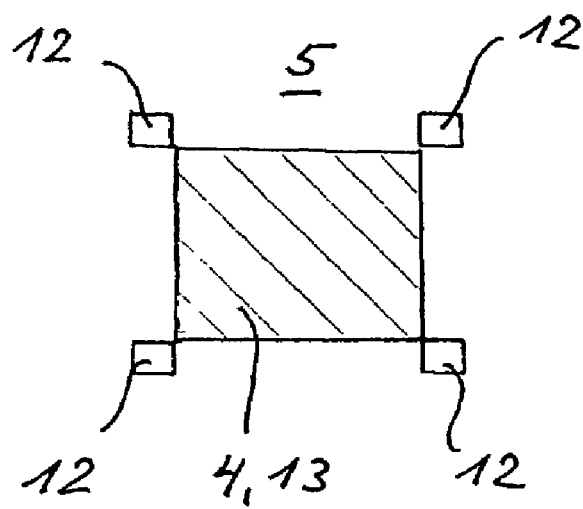
Figure 5:
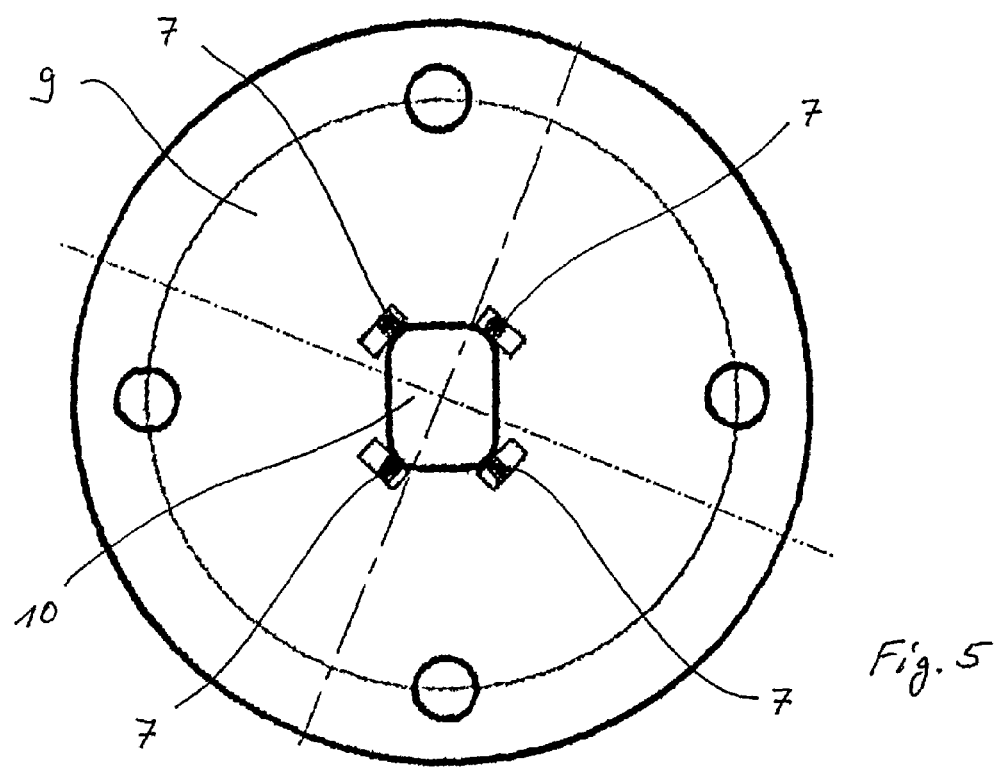
Figure 4:
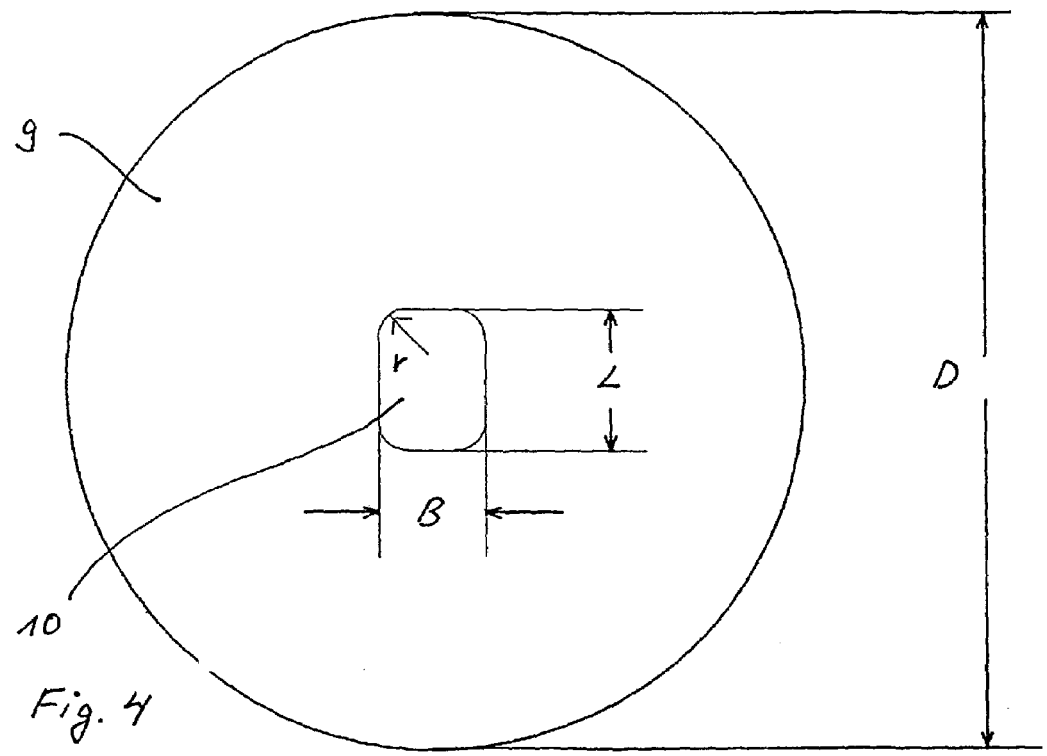
Figure 6:
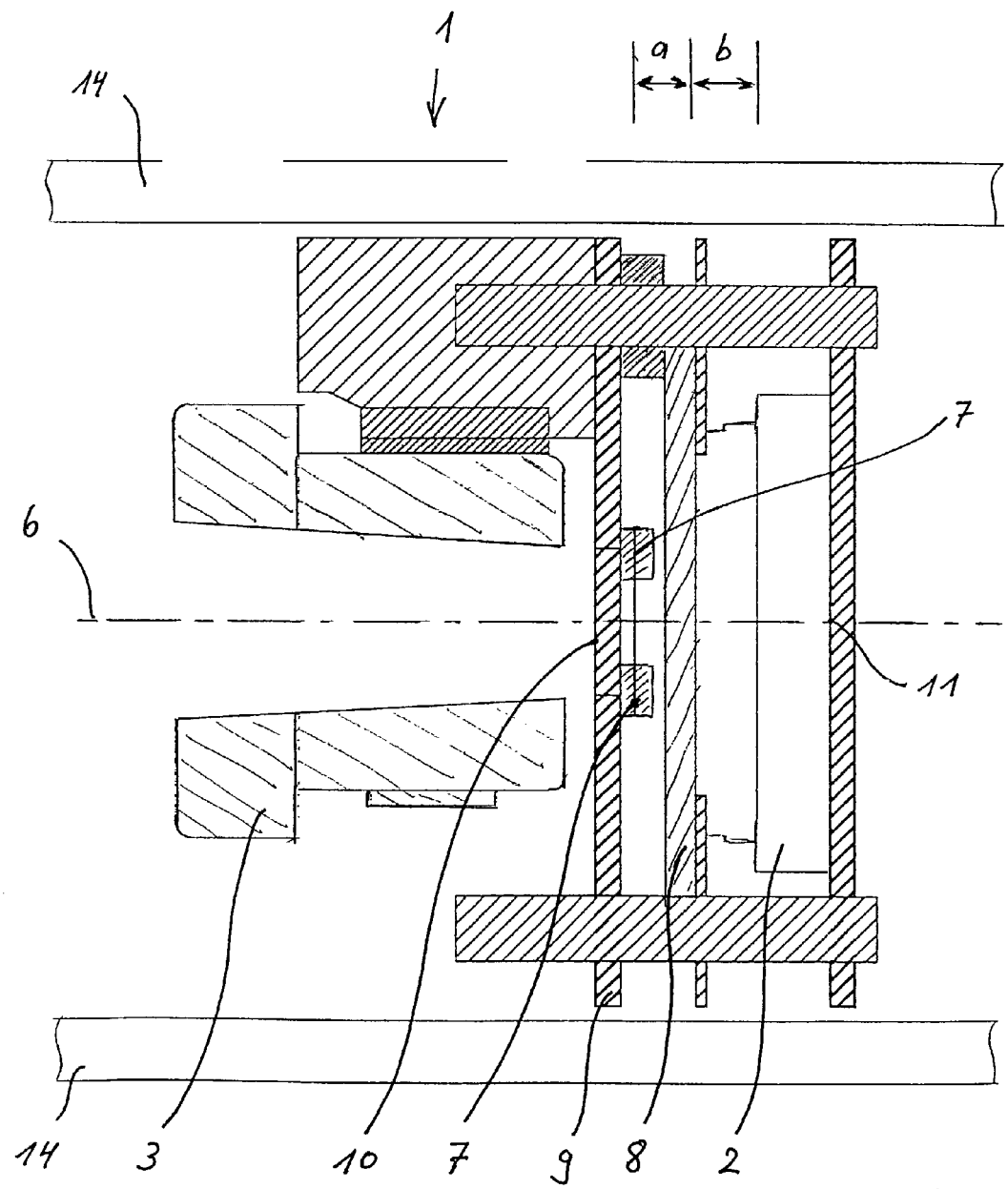

The invention will subsequently be explained in detail with the help of an exemplary embodiment shown in the figures. The features described there can be applied single or in a combination in order to create preferred embodiments of this invention. In the figures:

FIG. 1 shows a principal sketch of an optical path and a design according to the invention, FIG. 2 shows an arrangement of four light sources on a support, FIG. 3 shows the projected image of the light sources according to FIG. 2 on the object, FIG. 4 shows a modified support for the light sources, FIG. 5 shows the support according to FIG. 4 with light sources and FIG. 6 a longitudinal section through a camera according to the invention.

DETAILED DESCRIPTION OF THE PREFERRED EMBODIMENTS

FIG. 1 shows the optical path and the design according to the invention. It comprises a camera 1 with an image sensor 2 and an objective 3 for imaging an object 4 onto the image sensor 2. The object 4 is located in the object plane 5, which can be, during the adjustment, e.g. a white piece of paper. The optic axis 6 is also shown in the optical path.

The image sensor 2 is, e.g. a unidimensional (line) or bidimensional (matrix) CCD sensor, a CMOS sensor or a photo diode array. All kind of image sensors, i.e. semiconductor sensors, in form of CCD line or CCD matrix, CMOS line or CMOS matrix, photo diode lines or photo diode arrays, camera tubes, CID lines or CID matrix, vidicons, newicons, plumbicons etc., as well as spread individual detectors, i.e. photo diodes, or positions-sensitive detectors, e.g. PSDs, can be considered here. For example, a Hewlett Packard/Agilent HDSC 2000 CMOS sensor can be used.

For the objective 3, arbitrary optical systems can be used, from individual, simple, uncorrected lenses up to complex, corrected objectives. The use of zoom objectives is possible, too. For example, a SK12020S objective (Sekinos/Korea), 12 mm focal length, can be used.

The special feature in FIG. 1 consists in the light sources 7 and the partially transmitting mirror 8, serving for the adjustment of the distance between the camera 1 and the object 4, or the object plane 5, respectively, or for the adjustment of the objective 3, or for the adjustment of the position of the camera with respect to the object 4, in order to adjust the image field.

The partially transmitting mirror 8 is located between the objective 3 and the image sensor 2, arranged in parallel to the light-sensitive surface of the image sensor 2. The degree of partial reflectivity can be adapted to the practical experience, it can be between 1% and 99%, in practice, values around 50% have proven appropriate. For example, a partially transmitting mirror of the type Melles Griot 03BTF007, can be used. The partially transmitting mirror can serve, depending on the requirements, also as a filter, e.g. an IR rejection filter, an IR pass filter, a color filter or a polarization filter, for example with an additional coating and/or by the selection of an appropriate glass or plastic material.

The light sources 7 are LEDs, for example of the type Kingbright, Rheinmetall-Elektronik KP-1608SRC/Waterclear, 660 nm of GaAlAs, showing a width of 0.8 mm, a length of 1.6 mm and a height of 1.1 mm. The light sources 7 are arranged between the objective 3 and the partially transmitting mirror 8; they emit light towards the partially transmitting mirror 8. They are located on a support 9, for example a printed circuit board, comprising an aperture 10 for the optical beam path.

The distance a between the light sources 7 and the partially transmitting mirror 8 is equal to the distance b between the mirror 8 and the image sensor 2. As far as the respective elements extend towards the optical axis 6, the previously mentioned distance specifications relate to the light-sensitive surface for the image sensor 2, the mirrored surface for the partially transmitting mirror 8 and the light-emitting spot for the light sources 9.

By this special arrangement, it is achieved that the light emitted by the light sources 7 is reflected by the partially transmitting mirror 8, being projected there through the aperture 10 of the support 9 into the objective 3, and from there to the object plane 5, wherein the object plane 5 for the imaging of the object 4 onto the image sensor 2 is, at the same time, the image plane for imaging the light sources 7 onto the object plane 5. This results in the fact that the light projected from the light sources 7 onto the object plane 5, is focused when the image of the object 4 taken by the image sensor 2 is focused, too. Therefore, it is possible to check the focusing of the image with a screen, for example a white piece of paper, and, if necessary, to adjust the distance between camera 1 and object 4 or to adjust the objective 3. The distance between the camera 1 and the object 4, or the adjustment of the objective 3 for which the light sources 7 are imaged best focussed onto the object plane 5, is the distance which achieves the best focussed imaging of the object 4 onto the image sensor 2.

Thus, the objective 3 serves, on one hand, for the imaging of the object 4 onto the image sensor 2, and on the other hand for imaging the light emitted by the light sources 7 and reflected by the partially transmitting mirror 8 onto the object plane 5. The virtual distance between the light sources 7 and the objective 3 is equal to the distance between the image sensor 2 and the objective, so that the projected light sources 7 always indicate the image sharpness for the corresponding distance setting of the objective; this is even independent from the focal length of the objective 3. Due to the parallel arrangement of the partially transmitting mirror 8 with respect to image sensor 2, the structure can be kept compact, inexpensive and easily adjustable.

The emitting arrangement of the light sources 7 towards the intersection point 11 of the optical axis 6 of the camera 1, with respect to the image sensor 2, can be an advantageous feature. By this, the brightness of the light projected onto the object plane 5 can be increased. if the light sources 7 show an anisotropic emission characteristic.

If the shown device is to serve also for the adjustment of the image field of the image sensor 2, the light sources are preferably arranged, with respect to the image sensor 2, in a way that their image is projected by the partially transmitting mirror 8 and the objective 3 onto a place in the object plane 5 or on the object 4, respectively, which is located in the border range of the visual field of the image sensor 2. Thereby, the light sources 7 can be arranged in a way that their images are located in the object plane 5 around the outline of the object 4 to be imaged, i.e. the image field of the projected light sources 7 corresponds to the visual field of the image sensor 2, so that the visual field of the image sensor 2 can be seen directly by viewing the position of the image points of the light sources 7 in the object plane 5, i.e. on an object or on a screen.

FIGS. 2 and 3 show this. FIG. 2 shows a view of a support 9, for example a printed circuit board. It comprises an aperture 10 for the optical path, and the light sources are arranged directly at the border, or at the periphery, respectively, of this aperture 10. Preferably, the light sources 7 are arranged in a way that their position corresponds to the image section to be imaged, thus, in the example shown, in the corners of the rectangle of the aperture 10, limiting the image field.

In FIG. 3, the image—if necessary, magnified—of the light sources 7 in the object plane 5, is shown. The area on the object 4 corresponding to the aperture 10, imaged on the image sensor 2, thus the visual field 13 of the image sensor 4, is indicated by a shaded rectangle. In practice, this rectangle is of course not visible, but its position can be recognized due to the location of the image 12 of the light sources 7. Thereby it is possible to adjust the camera 1 by shifting it, in a way that the desired range of the object 4 is imaged on the image sensor 2.

It is clear that also a smaller or bigger amount of light sources 7 can be used; these can also be used in another arrangement, e.g. along the borders of the visual field 13, or arranged as light sources 7 emitting in lines. In case of a rectangular visual field 13 of an image sensor 2, preferably four light sources 7 are provided, the images of which are in the object plane 5 in the corner points of the visual field 13.

If, for example, the light-sensitive surface of an image sensor 2 is a rectangle of 4.8 mm×3.6 mm, and the position of the object points imaged on this rectangle is to be displayed in the object plane 5, preferably 4 light emitting diodes should be arranged on the support 9 in a way that their light emitting elements are positioned as exactly as possible at the corners of a rectangle of 4.8 mm×3.6 mm. The aperture 10 for the optical path on the support 9 is only insignificantly smaller than the rectangle of 4.8 mm×3.6 mm, depending on the selected distances of the individual light sources and the focal length of the used objective 3.

FIG. 4 shows a schematic top view of a prepared support 9 with aperture 10, and in FIG. 5, this support according to FIG. 4 is shown with mounted light sources 7 and mounting bores ready for mounting into a tube-shaped casing of a camera. The length L of the aperture 10 is approximately 4.8 mm, the width B approximately 3.6 mm and the diameter D of the support 9 is approximately 25 mm. In order to keep the shadowing of the light as low as possible, the light sources 7 in FIG. 5 are arranged with an angle of 45° with respect to the longitudinal and transversal borders of the aperture 10. This allows to provide the aperture 10 in the support 9 with a curvature radius r in the corners, which may be necessary due to manufacturing processes. A certain "overhang" of the light emitting diodes can also be provided, for which the connections of the light emitting diodes on the support, the so-called pads and lands, are completely pronounced, but not the clearance between the pads. These measures allow to position the light sources as close as possible to the corners of the visual field, thus projecting an image of the visual field into the object plane 5 which is as exact as possible.

FIG. 6 shows a longitudinal section through a section of a camera 1 equipped with a device according to the invention. It comprises a tube-shaped housing 14 with a support 9 inserted according to FIG. 5. The distance a between the light sources 7 and the mirroring layer of the partially transmitting mirror 8 should correspond as exactly as possible to the distance b between the mirroring layer of the partially transmitting mirror 8 and the light-sensitive surface of the image sensor 2. This can be ensured by appropriate constructive measures or by adjusting elements. For example, punched plastic packing shims, variable in thickness, can be used, also allowing a combination in order to obtain the correct distance.

LIST OF REFERENCE SIGNS

1 Camera
2 Image sensor
3 Objective
4 Object
5 Object plane
6 Optical axis
7 Light source
8 Partially transmitting mirror
9 Support
10 Aperture
11 Intersection point 2-6
12 Image to 7
13 Visual field
14 Housing
a Distance 7-8
b Distance 8-2
L Length
B Width
D Diameter
r Curvature radius

The invention claimed is:

1. Camera with an image sensor for taking a picture, with an objective for imaging an object on the image sensor and with a device for adjusting the distance between the camera and the object, or for adjusting the objective, comprising a partially transmitting mirror, arranged between the objective and the image sensor, and at least one light source, wherein the partially transmitting mirror is oriented in parallel to the light-sensitive surface of the image sensor, the at least one light source is arranged between the objective and the partially transmitting mirror and emits light towards the partially transmitting mirror, and the distance between the light source and the mirror is as long as the distance between the mirror and the image sensor.

2. Camera according to claim 1, wherein the image sensor and the light source are arranged on different sides of the partially trmsmitting mirror.

3. Camera according to claim 1, wherein the objective, the light source, the partially transmitting mirror and the image sensor are arranged in a straight row.

4. Camera according to claim 1, wherein the adjustment can be performed by viewing the image of the at least one light source projected through the objective, by eye, in the object plane.

5. Camera according to claim 1, wherein the at least one light source has a small light emitting surface.

6. Camera according to claim 1, wherein the at least one light source is shaped in a way that it emits light in a line.

7. Camera according to claim 1, wherein the at least one light source is a light emitting diode.

8. Camera according to claim 1, wherein the at least one light source does not comprise an optical element, e.g. a lens.

9. Camera according to claim 1, wherein it comprises at least three light sources.

10. Camera according to claim 9, wherein the light sources are arranged in a plane parallel to the light-sensitive surface of the image sensor.

11. Camera according to claim 1, wherein the at least one light source is arranged in relation to the image sensor, in a way that its image is projected by the partially transmitting mirror and the objective, onto a position of the object which is in the area of the border of the visual field of the image sensor.

12. Camera according to claim 11, wherein it comprises various light sources arranged in a way that their images are located in the object plane along the outline of the object to be imaged.

13. Camera according to claim 12, wherein it comprises four light sources the images of which are located in the object plane in the corner points of a rectangular visual field of the image sensor.

14. Camera according to claim 1, wherein the at least one light source is arranged in a way that it emits towards the intersection point of the optical axis of the camera with respect to the image sensor.

15. Camera according to claim 1, wherein the at least one light source is arranged on a support comprising an aperture for the optical path, wherein the at least one light source is arranged in the area of the border of the aperture.

16. Camera according to claim 1, wherein the objective is a zoom objective.

17. Method for adjusting the distance between a camera and an object or for adjusting the objective of the camera, wherein the camera comprises an image sensor for taking a picture and an objective for imaging an object onto the image sensor, wherein the camera is equipped with a partially transmitting mirror, arranged between the objective and the image sensor, and at least one light source is provided, wherein the partially transmitting mirror is oriented in parallel to the light-sensitive surface of the image sensor, the at least one light source is arranged between the objective and the partially transmitting mirror and emits light towards the partially transmitting mirror, wherein the distance between the light source and the mirror is as long as the distance between the mirror and the image sensor, and the adjustment of the distance between the camera and the object, or the adjustment of the objective is performed according to the image sharpness of the image of the at least one light source in the object plane.

18. Method according to claim 17, wherein the image sensor and the light source are arranged on different sides of the partially transmitting mirror.

19. Method according to claim 17, wherein the objective, the light source, the partially transmitting mirror and the image sensor are arranged in a straight row.

20. Method according to claim 17, wherein the adjustment can be performed by viewing the image of the at least one light source projected through the objective, by eye, in the object plane.

21. Method for adjusting the position of a camera in relation to an object, wherein the camera comprises an image sensor for taking a picture and an objective for imaging an object onto the image sensor, wherein the camera is equipped with a partially transmitting mirror, arranged between the objective and the image sensor, and at least one light source is provided, wherein the partially transmitting mirror is oriented in parallel to the light-sensitive surface of the image sensor, the at least one light source is arranged between the objective and the partially transmitting mirror and emits light towards the partially transmitting mirror, wherein the distance between the light source and the mirror is as long as the distance between the mirror and the image sensor, and the at least one light source is arranged in relation to the image sensor, in a way that its image is projected by the partially transmitting mirror and the objective, onto a position of the object which is in the area of the border of the visual field of the image sensor, and the position of the camera in relation to the object is adjusted according to the position of the image of the at least one light source projected onto the object.

22. Method according to claim 21, wherein various light sources are used, arranged in a way that their images are located in the object plane along the outline of the object to be imaged.

23. Method according to claim 22, wherein four light sources are used, the images of which are located in the object plane in the corner points of a rectangular visual field of the image sensor.

24. Method according claim 21, wherein the image sensor and the light source are arranged on different sides of the partially transmitting mirror.

25. Method according claim 21, wherein the objective, the light source, the partially transmitting mirror and the image sensor are arranged in a straight row.

26. Method according to claim 21, wherein the adjustment can be performed by viewing the image of the at least one light source projected through the objective, by eye, in the object plane.

* * * * *

UNITED STATES PATENT AND TRADEMARK OFFICE
CERTIFICATE OF CORRECTION

PATENT NO. : 7,019,782 B2  
APPLICATION NO. : 10/203163  
DATED : March 28, 2006  
INVENTOR(S) : Michael Engel Page 1 of 1

It is certified that error appears in the above-identified patent and that said Letters Patent is hereby corrected as shown below:

<u>Title page,</u>
Item [73], Assignee, should read -- Vision Components Gesellschaft Für Bildverarbeitungssysteme mbH --.

Signed and Sealed this

Twentieth Day of June, 2006

JON W. DUDAS
*Director of the United States Patent and Trademark Office*